Figure 1:
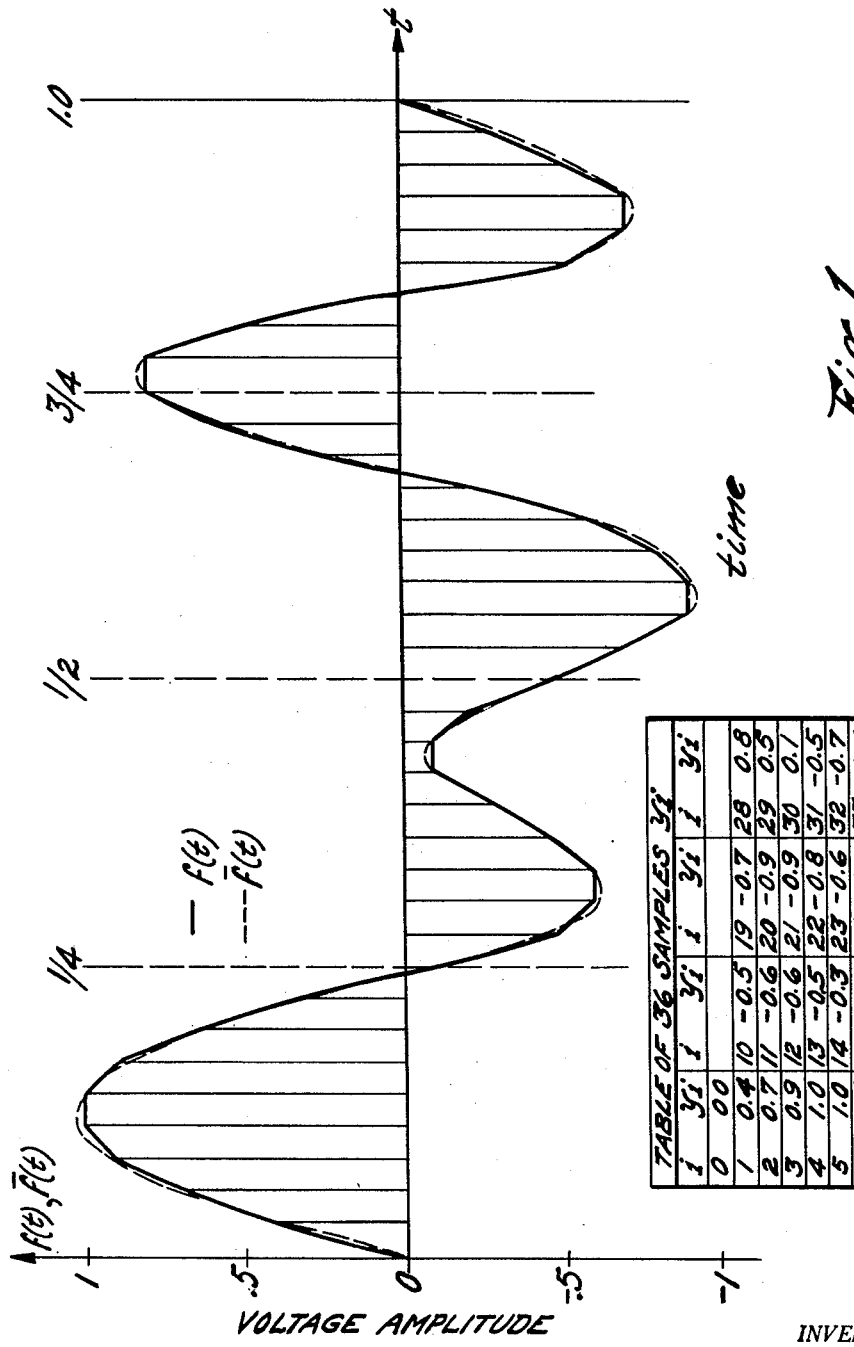

3,162,808
WAVE FORM ANALYZING METHOD FOR ESTABLISHING FOURIER COEFFICIENTS

Kurt H. Haase, Watertown, Mass., assignor to the United States of America as represented by the Secretary of the Air Force
Original application Sept. 18, 1959, Ser. No. 840,981. Divided and this application Nov. 18, 1960, Ser. No. 70,359
6 Claims. (Cl. 324—77)
(Granted under Title 35, U.S. Code (1952), sec. 266)

The invention described herein may be manufactured and used by or for the United States Government for governmental purposes without payment to me of any royalty thereon.

This is a division of original application, Serial No. 840,981, filed September 18, 1959, now U.S. Patent 3,009,106, by the same applicant and relates to analysis of electrical signals in accordance with their harmonic content and more particularly to a novel method for obtaining any desired number of Fourier coefficients of the periodic functions which constitute a complex periodic wave.

It is well known that any periodic wave which is single valued and continuous may be represented by the sum of an infinite number of sine waves of different amplitudes and frequencies. This is represented by the following equation and is known as a Fourier series:

$$f(t) = A_{0/2} + \sum_{m=1}^{\infty} a_m \cos 2\pi m t + \sum_{m=1}^{\infty} b_m \sin 2\pi m t \quad (1)$$

where $$A_0 = 2 \int_0^1 f(t) \, dt \quad (2)$$

$$a_m = 2 \int_2^1 f(t) \cos 2\pi m t \, dt \quad (3)$$

$$b_m = 2 \int_0^1 f(t) \sin 2\pi m t \, dt \quad (4)$$

It is therefore only necessary to obtain an adequate number of values for the coefficients $A_{0/2}$, $a_m$ and $b_m$ (known as Fourier coefficients) to provide an accurate expression for any non-sinusoidal periodic wave.

It is a common problem in the fields of engineering, applied physics and mathematics to obtain these coefficients and specifically the subject invention may be used in investigations of speech sounds, X-ray examinations of the crystal structure of materials, the field of propagation, and seismic exploration and color matching through the medium of spectro-photometric curves.

Known methods of determining the equation of a complex wave include experimental observation, the use of oscillograms, the use of a comb filter to filter out the harmonic frequencies and the use of synthesizers which generate component waves and vary their phase, frequency and amplitude to simulate the wave to be analyzed. These analyzing methods are limited to a finite number of coefficients or by the total bandwidths of filters and synthesizers.

The present invention avoids the aforementioned limitations of known Fourier analyzing methods by teaching a novel technique of deriving, instead of the elementary natural coefficients defined by Fourier, periodic coefficients, each of which is multiplied by real number factors which are functions of the number of harmonic orders desired and the number of segments the wave has been divided into.

Accordingly, it is necessary to obtain only a certain limited number of periodic coefficients and to multiply these periodic coefficients by applicable real number factors to deliver any arbitrary number of natural Fourier coefficients.

It is therefore the principal object of this invention to teach a novel method of determining any desired number (without limit) of Fourier coefficients as the product of a periodic cofficient and applicable real number factors.

Figure 2:
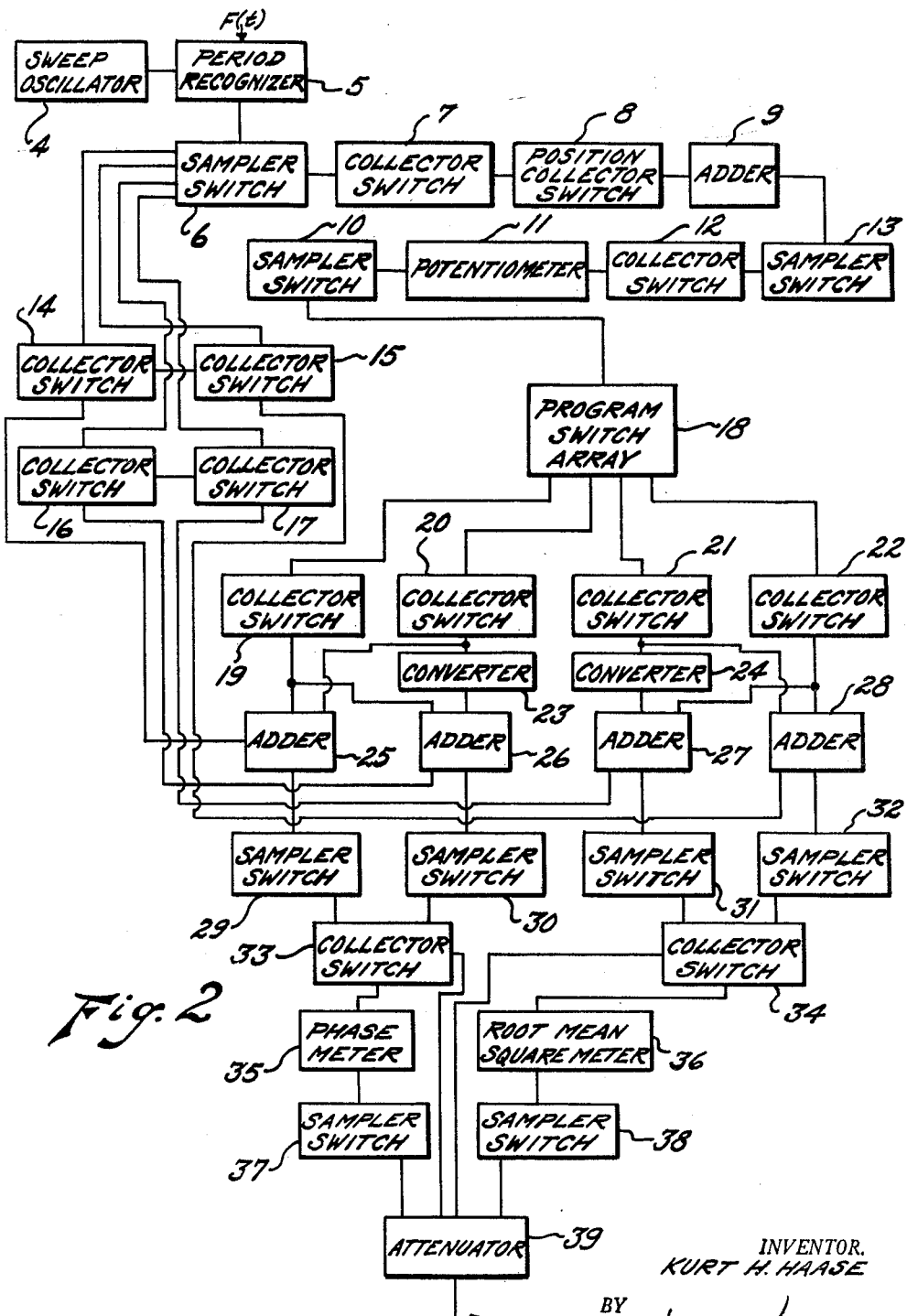

The novel features which I believe to be characteristic of my invention are set forth with particularity in the appended claims. The invention itself, however, together with further objects and advantages thereof can best be understood by reference to the following description taken in connection with the accompanying drawings, in which:

FIGURE 1 illustrates a typical periodic non-sinusoidal wave and its approximate equivalent consisting of a polygonial sequence of straight lines; and FIGURE 2 is a block diagram illustrating one possible means for performing the subject method.

Referring now to said drawings, the period of a function $\bar{f}(t)$ (dotted) which is in sufficient correspondence with the polygonial sequence of straight lines $f(t)$ (solid lines) is shown to be divided into an integral number of segments in the $t$ (time) direction. If a periodic function $f(t)$ is approximated by a polygonial trace of straight lines, when the Fourier coefficients $a_m$ and $b_m$ are substantially the same for $f(t)$ and for its approximation. I have found that if the corners of the polygon trace are equidistant in the direction of the $t$-axis, so that the interval of the period is divided into $n$ equal sections, then the coefficients can be written as products $$a_m = K_n C_m a^*_m \quad (5)$$

$$b_m = K_n C_m b^*_m \quad (6)$$

where $K_n$ is defined as a number factor dependent upon the number of equal timewise segments $f(t)$ has been divided into, $C_m$ is a number factor which is tabulated for any harmonic order $m$ as illustrated in table I; and $a^*_m$ and $b^*_m$ represent groupwise intercorrelated periodic coefficients. These parameters are further defined by the following equations and table:

$$K_n = \frac{\sin \pi/4N}{\pi} \sqrt{8N} \quad (7)$$

$$C_m = \frac{\sin \pi m/4N}{m \sin \pi/4N} \quad (8)$$

$$a^*_m = \sum_{i=1}^{i=4N} y_i \cos\left(\frac{\pi m}{2n} i\right) \quad (9)$$

$$b^*_m = \sum_{i=1}^{i=4N} y_i \sin\left(\frac{\pi m}{2N} i\right) \quad (10)$$

Table of Factors $C_m^2$ for parameter $N=9$.

| $m$ | $C_m^2$ | | $m$ | $C_m^2$ | | $m$ | $C_m^2$ | | $m$ | $C_m^2$ | |
|---|---|---|---|---|---|---|---|---|---|---|---|
| 0 | | | 20 | 0.319 | 189 | 40 | 0.0²962 | 473 | 60 | 0.0274 | 261 |
| 1 | 1.000 | 000 | 21 | .278 | 519 | 41 | 0.0139 | 873 | 61 | 237 | 397 |
| 2 | 0.992 | 396 | 22 | .240 | 177 | 42 | 186 | 572 | 62 | 200 | 969 |
| 3 | .979 | 840 | 23 | .204 | 410 | 43 | 234 | 234 | 63 | 165 | 842 |
| 4 | .962 | 473 | 24 | .171 | 413 | 44 | 280 | 954 | 64 | 132 | 795 |
| 5 | 0.940 | 506 | 25 | 0.141 | 337 | 45 | 0.0325 | 050 | 65 | 0.0102 | 509 |
| 6 | .914 | 204 | 26 | .114 | 279 | 46 | 365 | 088 | 66 | 0.0²755 | 540 |
| 7 | .883 | 876 | 27 | 0.0902 | 918 | 47 | 399 | 888 | 67 | 523 | 783 |
| 8 | .849 | 887 | 28 | .693 | 785 | 48 | 428 | 533 | 68 | 333 | 036 |
| 9 | .812 | 626 | 29 | 514 | 981 | 49 | 450 | 365 | 69 | 185 | 225 |
| 10 | 0.772 | 526 | 30 | 0.0365 | 681 | 50 | 0.0464 | 983 | 70 | 0.0³810 | 119 |
| 11 | .730 | 044 | 31 | 244 | 668 | 51 | 472 | 229 | 71 | 198 | 373 |
| 12 | .685 | 652 | 32 | 150 | 386 | 52 | 472 | 174 | 72 | 0.00000 | 000 |
| 13 | .639 | 838 | 33 | 0.0²809 | 785 | 53 | 465 | 096 | 73 | 0.0³187 | 652 |
| 14 | .593 | 091 | 34 | 343 | 390 | 54 | 451 | 459 | 74 | 724 | 906 |
| 15 | 0.545 | 897 | 35 | 0.0³816 | 327 | 55 | 0.0431 | 886 | 75 | 0.0²156 | 774 |
| 16 | .498 | 734 | 36 | 0.00000 | 000 | 56 | 407 | 129 | 76 | 266 | 613 |
| 17 | .452 | 060 | 37 | 0.0³703 | 586 | 57 | 378 | 045 | 77 | 396 | 570 |
| 18 | .406 | 313 | 38 | 0.0²274 | 902 | 58 | 345 | 558 | 78 | 540 | 949 |
| 19 | .361 | 899 | 39 | 579 | 787 | 59 | 310 | 637 | 79 | 693 | 958 |
| 20 | 0.319 | 189 | 40 | 0.0²962 | 473 | 60 | 0.0274 | 261 | 80 | 0.0²849 | 887 |

I have discovered, and it is fundamental to my invention, that periodic coefficients $a^*_m$ and $b^*_m$ are, under certain conditions, common parameters of intercorrelated groups of periodic functions which constitute the wave to be analyzed. More specifically I have found that in a periodic wave which has been segregated into $n$ timewise equidistant segments, as illustrated in FIGURE 1, the periodic coefficients for intercorrelated groups of periodic functions are identical at points $i$, $\pi-i$, $\pi+i$ and $2\pi-i$. This is true also of periodic coefficients at points $2i$, $\pi-2i$, $\pi+2i$ and $2\pi-2i$ and for other intercorrelated groups up to $N-i$. Therefore, to solve for any number of Fourier coefficients it is only necessary to obtain $n$ sample $y$ values of the wave to be analyzed, group said sample $y$ values as indicated and multiply the groups by the number factors $K_n$ and $C_m$.

To facilitate grouping of values, the following equations have been formulated in which the notations involving group summations have a systematic background in the choice of capital letters and indices which makes their distinction easy. Coefficients, and related functions thereof, associated with said intercorrelated groups of periodic functions are designated by an asterisk, said asterisk being a general symbol intended to differentiate the periodic functions comprehended by my invention from the so-called natural Fourier functions. $N$ is an integer defined as $$N = \frac{n}{4}$$

Capital letters H and F are summations of 4 distinct sample values, $y_i$, $\pm y_{2n-i}$, $\pm y_{n+i}$, and $+y_{n-i}$. Capital H is correlated to even indexed coefficients $a^*_{2\mu}$, capital F to odd indexed coefficients $a^*_{2\mu+1}$. According to indices $2i$ or $2i-1$, H and F make a choice between group summations beginning with even or odd numbered samples $y_{2i}$ or $y_{2i-1}$. For computation of $b^*_m$ coefficients, these capitals are marked by a bar. Capital letter G is used in summations involving even indices $2i$ in H and F as well as in the trigonometric function. Capital letter U is used where $2i-1$ appears instead of $2i$. The indices of G and U may be, corresponding to m, $2\mu$ or $2\mu+1$. Again barred capitals $\overline{G}$ and $\overline{U}$ are used for computation formulas for $b^*_m$ coefficients.

$$F_i = (y_i + y_{4N-i}) - (y_{2N-i} + y_{2N+i}) \quad (11)$$

$$H_i = (y_i + y_{4N-i}) + (y_{2N-i} + y_{2N+i}) \quad (12)$$

$$\overline{F}_i = (y_i - y_{4N-i}) + (y_{2N-i} - y_{2N+i}) \quad (13)$$

$$\overline{H}_i = (y_i - y_{4N-i}) - (y_{2N-i} - y_{2N+i}) \quad (14)$$

Using $H_i$ defined in (12) we get $$a_0 = \frac{1}{2N}\left[(y_N + y_{3N}) + y_{2N} + \sum_{i=1}^{\gamma-1}(H_{2i-1} + H_{2i})\right] \text{ if } N \text{ odd} = 2\gamma - 1 \quad (14a)$$

$$a_0 = \frac{1}{2N}\left[(y_N + y_{3N}) + y_{2N} + \sum_{i=1}^{\gamma} H_{2i-1} + \sum_{i=1}^{\gamma-1} H_{2i}\right] \text{ if } N \text{ even} = 2\gamma \quad (14b)$$

It can be shown that if $1 \leq m \leq (N-1)$ $$a^*_m = a^*_{4N-m} \quad (15)$$

$$a^*_{2N-m} = a^*_{2N+m} \quad (15a)$$

$$b^*_m = -b^*_{4N-m} \quad (16)$$

$$b^*_{2N-m} = b^*_{2N+m} \quad (16a)$$

Introducing the sums defined in (11) ... (14) into Equs. 9 and 10 we define now two subgroups of sums, namely

*Sub sums* $G_m$ where only even indexed sums $F_{2i}$, $H_{2i}$, $\overline{F}_{2i}$, $\overline{H}_{2i}$ are included and

*Sub sums* $U_m$ where only odd indexed sums $F_{2i-1}$, $H_{2i-1}$, $\overline{F}_{2i-1}$ and $\overline{H}_{2i-1}$ are included.

Furthermore, we discriminate between *even indices* $m_e = 2\mu$ and *odd indices* $m_o = 2\mu - 1$.

So, we define, if $\overline{N \text{ odd} = 2\gamma - 1}$ $$G_{2\mu-1} = \sum_{i=1}^{\gamma-1} F_{2i} \cos \frac{\pi(2\mu-1).2i}{2N} \quad 1 \leq \mu \leq \gamma \quad (17)$$

$$G_{2\mu} = \sum_{i=1}^{\gamma-1} H_{2i} \cos \frac{\pi.2\mu 2i}{2N} \quad 0 \leq \mu \leq (\gamma-1) \quad G_0 = \sum_{i=1}^{\gamma-1} H_{2i} \quad (17a)$$

$$U_{2\mu-1} = \sum_{i=1}^{\gamma-1} F_{2i-1} \cos \frac{\pi(2\mu-1)(2i-1)}{2N} \quad 1 \leq \mu \leq \gamma \quad U_{2\gamma-1} = 0 \quad (17b)$$

$$U_{2\mu} = \sum_{i=1}^{\gamma-1} H_{2i-1} \cos \frac{\pi.2\mu.(2i-1)}{2N} \quad 0 \leq \mu \leq (\gamma-1) \quad U_0 = \sum_{i=1}^{\gamma-1} H_{2i-1} \quad (17c)$$

$$\overline{G}_{2\mu-1} = \sum_{i=1}^{\gamma-1} \overline{F}_{2i} \sin \frac{\pi(2\mu-1).2i}{2N} \quad 1 \leq \mu \leq \overline{G}_{2\gamma-1} = 0 \quad (17d)$$

$$\overline{G}_{2\mu} = \sum_{i=1}^{\gamma-1} F_{2i} \sin \frac{\pi \cdot 2\mu \cdot 2i}{2N} \quad 1 \leq \mu \leq (\gamma-1) \quad (17e)$$

$$\overline{U}_{2\mu-1} = \sum_{i=1}^{\gamma-1} F_{2i-1} \sin \frac{\pi(2\mu-1)(2i-1)}{2N} \quad 1 \leq \mu \leq (\gamma-1) \quad (17f)$$

$$\overline{U}_{2\mu} = \sum_{i=1}^{\gamma-1} H_{2i-1} \sin \frac{\pi \cdot 2\mu \cdot (2i-1)}{2N} \quad 1 \leq \mu \leq (\gamma-1) \quad (17g)$$

If $N$ even $= 2\gamma$ we define $$G_{2\mu-1} = \sum_{i=1}^{\gamma-1} F_{2i} \cos \frac{\pi(2\mu-1) \cdot 2i}{2N} \quad 1 \leq \mu \leq \gamma \quad (18)$$

$$G_{2\mu} = \sum_{i=1}^{\gamma-1} H_{2i} \cos \frac{\pi \cdot 2\mu 2i}{2N} \quad 0 \leq \mu \leq \gamma \, G_0 = \sum_{i=1}^{i=\gamma-1} H_{2i} \quad (18a)$$

$$H_{2\mu-1} = \sum_{i=1}^{\gamma} F_{2i-1} \cos \frac{\pi(2\mu-1)(2i-1)}{2N} \quad 1 \leq \mu \leq \gamma \quad (18b)$$

$$U_{2\mu} = \sum_{i=1}^{\gamma} H_{2i-1} \cos \frac{\pi \cdot 2\mu (2i-1)}{2N} \quad 0 \leq \mu \leq \gamma \, U_0 = \sum_{i=1}^{i=\gamma} H_{2i-1} \quad (18c)$$

$$\overline{G}_{2\mu-1} = \sum_{i=1}^{\gamma-1} \overline{F}_{2i} \sin \frac{\pi(2\mu-1) \cdot 2i}{2N} \quad 1 \leq \mu \leq \gamma \quad (18d)$$

$$\overline{G}_{2\mu} = \sum_{i=1}^{\gamma-1} H_{2i} \sin \frac{\pi \cdot 2\mu 2i}{2N} \quad 1 \leq \mu \leq \overline{G}_{2\gamma} = 0 \quad (18e)$$

$$\overline{U}_{2\mu-1} = \sum_{i=1}^{\gamma} F_{2i-1} \sin \frac{\pi(2\mu-1)(2i-1)}{2N} \quad 1 \leq \mu \leq \gamma \quad (18f)$$

$$\overline{U}_{2\mu} = \sum_{i=1}^{\gamma} H_{2i-1} \sin \frac{\pi \cdot 2\mu (2i-1)}{2N} \quad 1 \leq \mu \leq \gamma \quad (18g)$$

Substituting the subsums $G_m$ and $U_m$ into Equs. 9 and 10 we get $$a^*_{2\mu-1} = a^*_{4N-(2\mu-1)} = -y_{2N} + (G_{2\mu-1} + U_{2\mu-1}) \quad (19)$$

$$a^*_{2\mu} = a^*_{4N-2\mu} = (y_N + y_{3N})(-1)^\mu + y_{2N} + (G_{2\mu} + U_{2\mu}) \quad (19a)$$

$$a^*_{2N-(2\mu-1)} = a^*_{2N+(2\mu-1)} = -y_{2N} + (G_{2\mu-1} - U_{2\mu-1}) \quad (19b)$$

$$b^*_{2\mu-1} = -b^*_{4N-(2\mu-1)} = -(y_N - y_{3N})(-1^\mu + (\overline{U}_{2\mu-1} + \overline{G}_{2\mu-1}) \quad (19c)$$

$$b^*_{2\mu} = -b^*_{4N-2\mu} = (\overline{U}_{2\mu} + \overline{G}_{2\mu}) \quad (19d)$$

$$b^*_{2N-2\mu} = -b^*_{2N+2\mu} = (\overline{U}_{2\mu} - \overline{G}_{2\mu}) \quad (19e)$$

and if $\overline{N \text{ odd} = 2\gamma - 1}$ $$a^*_{2N-2\mu} = a^*_{2N+2\mu} = -(y_N + y_{3N})(-1)^\mu + y_{2N} + (G_{2\mu} - U_{2\mu}) \quad (20)$$

$$b^*_{2N-(2\mu-1)} = -b^*_{2N+(2\mu-1)} = -(y_N - y_{3N})(-1)^\mu + (\overline{U}_{2\mu-1} - \overline{G}_{2\mu-1}) \quad (20a)$$

and if $\overline{N \text{ even} = 2\gamma}$ $$a^*_{2N-2\mu} = a^*_{2N+2\mu} = (y_N + y_{3N})(-1)^\mu + y_{2N} + (G_{2\mu} - U_{2\mu}) \quad (21)$$

$$b^*_{2N-(2\mu-1)} = -b^*_{2N+(2\mu-1)} = (y_N - y_{3N})(-1)^\mu - (\overline{U}_{2\mu-1} - \overline{G}_{2-\mu 1}) \quad (21a)$$

By Equs. 19, 20 and 21 all periodic coefficients are known.

As it has been already stated, Fourier analysis can be carried out by using any number of timewise equidistant samples within one period of the periodic function to be analyzed. To use $n=4N$ samples where N is an integer has practical advantages. For the design outlined in the following paragraphs $n$ is assumed to be 36 and N consequently equals 9.

It is obvious, from a review of the unique concepts and equations developed herein, that each step of the subject method invention may be performed manually. It is equally obvious that the individual steps, either separately or collectively, may be readily adapted to automatic computing devices. Typical of such automatic computing devices is the Wave Form Analyzing Apparatus illustrated by the block diagram of FIG. 2, which Form Analyzing Apparatus is the subject of my co-pending patent application, Serial No. 840,981, wherein it is described in detail. Basically, the subject analyzing apparatus comprises three stages; a period recognizer and storage stage, an operational circuit stage, and an attenuator stage. The period recognizer and storage stage wherein each of the 36 samples on FIG. 1 ($y_0=0$, $y_1$, $y_2$ . . . $Y_{35}$, $y_{36}=0$) is stored up to the end of the computation process comprises sweep oscillator means 4, period recognizer 5, sampler switches 6, 10 and 13, position collector switches 7 and 8, adder means 9, and potentiometer means 11. The operational circuit stage comprehends all the circuitry required to compute the periodic coefficients and includes collector switches 14, 15, 16, 17, 19, 20, 21, 22, 33 and 34, program switch array 18, converters 23 and 24, adders 25 through 28, and sampler switches 29 through 32 arranged as shown. The operations involved are, sampling and collecting of values derived from the sample valves $y_0$ . . . $y_{36}$, additions and polarity conversions, and, finally, multiplication of sample or derived values by real values $\leq 1$. The attenuator stage provides automatic means for deriving natural coefficients from the periodic ones and includes attenuator means 39, sampler switches 37 and 38, phase meter 35, and root-mean-square meter 36 arranged as shown.

There has thus been disclosed novel concepts and equations which, when carried out either manually or by means of mechanical apparatus, provide an improved method of performing a Fourier analysis in accordance with the objects set forth herein.

What is claimed is:

1. A method of performing a Fourier analysis comprising the steps of establishing one complete period of the non-sinusoidal function to be analyzed, measuring amplitude values of said period at a plurality of intervals equally spaced in time, grouping said amplitude values according to their common harmonic orders, deriving first and second real number factors, and multiplying said groups by said first and second real number factors, said first real number factor being a function of the number of Fourier coefficients desired, and said second real number factor being a function of the number of amplitude values taken.

2. The method of determining Fourier coefficients of a nonsinusoidal periodic function which consists of taking a number of sample amplitude values at intervals equally spaced in time of the nonsinusoidal function to be analyzed, collecting said sample values according to common harmonic groups of the sinusoidal components which constitute said nonsinusoidal function, deriving first and second real number factors, and multiplying said common harmonic groups by real number factors which are a function of the number of Fourier coefficients desired and the number of equal sample values taken.

3. A method of obtaining any desired number of Fourier coefficients of a nonsinusoidal periodic wave comprising the steps of establishing the period of the wave to be analyzed, taking a number of amplitude values equally spaced in time of one period of said wave, collecting said sample values into groups according to their common harmonic orders, deriving first and second real number factors, and multiplying said groups by real number factors. said real number factors being dependent upon the number of Fourier coefficients desired and the number of sample values taken.

4. A method of establishing any desired number of Fourier coefficients consisting of establishing the period of the wave to be analyzed, dividing said wave into an integral number of amplitude values equally spaced in time, grouping said amplitude values according to an integral number of equal sections of the component sinusoidal wave periods which constitute the wave to be analyzed to form groups of periodic functions, intercorrelating said groups of periodic functions in accordance with their predetermined mathematical relationships, deriving real number factors which are functions of the number of harmonic orders desired and the number of segments the wave to be analyzed has been divided into, and multiplying each of said intercorrelated groups by their corresponding real number factors to obtain the desired number of natural Fourier coefficients.

5. A method of performing a Fourier analysis of a nonsymmetrical period wave comprising the steps of establishing the period of the wave to be analyzed, dividing said wave into an integral number of amplitude values equally spaced in time, grouping said amplitude values according to their common harmonic orders, deriving a first real number factor which is a function of the number of amplitude samples taken and the number of Fourier coefficients desired, multiplying said groups by said first real number factor, summing such products with corresponding amplitude values to form periodic Fourier coefficients, deriving a second real number factor which is a function of the number of amplitude values taken, and multiplying said periodic Fourier coefficients by said second real number factor to obtain the natural Fourier coefficients.

6. The method of determining the Fourier coefficients of a nonsinusoidal periodic function $f(t)$ for any desired harmonic order $m$ comprising the steps of establishing the period of the wave to be analyzed; dividing said period into $n$ equal parts $i$; grouping amplitude values $y$ taken at $t_{ki}$, $\pi \pm t_{ki}$ and $2\pi - t_{ki}$ according to the sum and difference of the sums and differences of the means and extremes of said values $y$ for $n/4 - 1$ values of index integer $k$; multiplying such grouped values by real number coefficient $$\frac{\sin \pi m/n}{m \sin \pi/n}$$

grouping the products with the value of $y$ taken at $\pi$, according to even and odd values of index integer $k$; and multiplying said groups by the coefficient $$\sin \frac{\pi/n}{\pi} \sqrt{2n}$$

where $n$ is an integral number of samples, $i$ is a particular part, $t_{ki}$, $\pi \pm t_{ki}$ and $2\pi - t_{ki}$ are particular points along the period of the wave to be analyzed where sample values $y$ are taken, and $m$, $n$ and $i$ cover the range of the number of natural Fourier coefficients desired.

References Cited by the Examiner
UNITED STATES PATENTS

| | | | |
|---|---|---|---|
| 2,679,013 | 5/54 | Barnes | 324—77 X |
| 2,752,092 | 6/56 | McDonal | 324—77 |
| 2,829,173 | 1/58 | Raabe. | |
| 2,851,661 | 9/58 | Buland | 327—77 |
| 2,866,899 | 12/58 | Busignies et al. | |
| 2,934,708 | 4/60 | Stuntz. | |

WALTER L. CARLSON, *Primary Examiner.*
SAMUEL BERNSTEIN, *Examiner.*